United States Patent
Hara et al.

(10) Patent No.: US 9,559,359 B2
(45) Date of Patent: Jan. 31, 2017

(54) LITHIUM SECONDARY BATTERY AND POSITIVE ELECTRODE FOR THE BATTERY

(75) Inventors: Tomitaro Hara, Okazaki (JP); Akira Tsujiko, Aichi-ken (JP); Takeshi Abe, Okazaki (JP); Sachie Yuasa, Okazaki (JP); Keiko Wasada, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 498 days.

(21) Appl. No.: 13/499,323

(22) PCT Filed: Oct. 2, 2009

(86) PCT No.: PCT/JP2009/067272
§ 371 (c)(1),
(2), (4) Date: Mar. 30, 2012

(87) PCT Pub. No.: WO2011/039891
PCT Pub. Date: Apr. 7, 2011

(65) Prior Publication Data
US 2012/0183851 A1    Jul. 19, 2012

(51) Int. Cl.
*H01M 4/80* (2006.01)
*H01M 4/02* (2006.01)
(Continued)

(52) U.S. Cl.
CPC ........... *H01M 4/5825* (2013.01); *H01M 4/136* (2013.01); *H01M 4/1397* (2013.01); *H01M 4/623* (2013.01); *H01M 4/625* (2013.01); *H01M 4/366* (2013.01); *H01M 10/613* (2015.04); *H01M 10/625* (2015.04); *H01M 10/6555* (2015.04); *H01M 10/6561* (2015.04); *H01M 2004/028* (2013.01); *Y02E 60/122* (2013.01); *Y02P 70/54* (2015.11)

(58) Field of Classification Search
CPC .. H01M 4/5825; H01M 4/1397; H01M 4/366; H01M 10/5004; H01M 10/5016
USPC .................................................. 429/235, 211
See application file for complete search history.

(56) References Cited

U.S. PATENT DOCUMENTS

2003/0129496 A1    7/2003    Kasai et al.
2004/0229123 A1    11/2004    Takahashi et al.
(Continued)

FOREIGN PATENT DOCUMENTS

CN    1714465    12/2005
CN    1838454 A    9/2006
(Continued)

OTHER PUBLICATIONS

International Search Report in International Application No. PCT/JP2009/067272; Mailing Date: Dec. 22, 2009.
(Continued)

*Primary Examiner* — Helen O Conley
(74) *Attorney, Agent, or Firm* — Finnegan, Henderson, Farabow, Garrett & Dunner, LLP (57) ABSTRACT

The lithium secondary battery positive electrode provided by the present invention has a positive electrode collector and a positive active material layer formed on the collector. The positive active material layer is composed of a matrix phase containing at least one particulate positive active material and at least one binder, and an aggregate phase dispersed in the matrix phase, constituted by aggregation of at least one particulate positive active material and containing substantially no binder.

11 Claims, 4 Drawing Sheets

(51) Int. Cl.
*H01M 4/58* (2010.01)
*H01M 4/136* (2010.01)
*H01M 4/1397* (2010.01)
*H01M 4/62* (2006.01)
H01M 4/36 (2006.01)
H01M 10/625 (2014.01)
H01M 10/6555 (2014.01)
H01M 10/6561 (2014.01)
H01M 10/613 (2014.01)

(56) References Cited

U.S. PATENT DOCUMENTS

| | | |
|---|---|---|
| 2006/0035150 A1 | 2/2006 | Audemer et al. |
| 2006/0263697 A1 | 11/2006 | Dahn et al. |
| 2008/0233477 A1 | 9/2008 | Takahashi et al. |
| 2009/0142668 A1 | 6/2009 | Ishii |
| 2010/0075229 A1 | 3/2010 | Atsuki et al. |
| 2012/0183851 A1 | 7/2012 | Hara et al. |
| 2012/0189914 A1 | 7/2012 | Hara et al. |

FOREIGN PATENT DOCUMENTS

| | | |
|---|---|---|
| CN | 101064367 | 10/2007 |
| EP | 1 850 409 | 10/2007 |
| JP | 11195419 A | 7/1999 |
| JP | 2002231222 A | 8/2002 |
| JP | 2003-203632 | 7/2003 |
| JP | 2003292308 A | 10/2003 |
| JP | 2003292309 A | 10/2003 |
| JP | 2004-311408 | 11/2004 |
| JP | 2005530676 A | 10/2005 |
| JP | 2006-4631 | 1/2006 |
| JP | 2006216371 A | 8/2006 |
| JP | 2007-35358 | 2/2007 |
| JP | 2007-234277 | 9/2007 |
| JP | 2008-117749 | 5/2008 |
| JP | 2008251497 A | 10/2008 |
| JP | 2008-270204 | 11/2008 |
| JP | 2008541406 A | 11/2008 |
| JP | 2009-43703 | 2/2009 |
| JP | 2009-146773 | 7/2009 |
| JP | 2009-152188 | 7/2009 |
| JP | 2009129889 A | 11/2009 |
| JP | 5370790 A | 9/2013 |
| KR | 2005094346 A | 9/2005 |
| WO | WO 2011/039690 | 4/2011 |

OTHER PUBLICATIONS

Kwang Man Kim, et al.—"Crystalline Properties of PVdF/NMP Solution-Cast Films by Different Evaporation Temperatures" Theories and Applications of Chem. Eng., 2002, vol. 8, No. 2, 5482-5485.

Restriction Requirement issued in U.S. Appl. No. 13/499,307, mailed Aug. 26, 2014.

First Office Action issued in U.S. Appl. No. 13/499,307, mailed Nov. 19, 2014.

Final Office Action issued in U.S. Appl. No. 13/499,307, mailed Mar. 11, 2015.

Final Office Action for U.S. Appl. No. 13/499,307 dated Mar. 11, 2015.

Notice of Allowance and Notice of Allowability for U.S. Appl. No. 13/499,307 dated Feb. 12, 2016.

LITHIUM SECONDARY BATTERY AND POSITIVE ELECTRODE FOR THE BATTERY

CROSS-REFERENCE TO RELATED APPLICATIONS

This application is a national phase application of International Application No. PCT/JP2009/067272, filed Oct. 2, 2009, the contents of which are incorporated herein by reference.

TECHNICAL FIELD

The present invention relates to a lithium secondary battery, and specifically to a positive electrode for use in such a lithium secondary battery. The present invention also relates to a positive active material layer of a positive electrode of a lithium secondary battery, and to a positive electrode material constituting this positive active material layer. The present invention also relates to a method for manufacturing a lithium secondary battery positive electrode, which includes the use of the positive electrode material to manufacture a positive active material layer.

BACKGROUND ART

In recent years, lithium secondary batteries (typically lithium-ion batteries), nickel hydrogen batteries and other secondary batteries have gained importance as vehicle-mounted power sources or power sources for personal computers and handheld devices. Lithium secondary batteries hold particular promise as high-output vehicle-mounted power sources because they provide high energy densities with low weight.

First and foremost, lithium secondary batteries used as motor drive power sources in electric vehicles (EV), hybrid vehicles (HV), plug-in hybrid vehicles (PHV) and other vehicles must be suited to high-rate (such as 10 C or more) charge and discharge. One way of satisfying this first requirement is to use a fine particulate compound for the positive active material. Recently, fine particulate positive active materials with an average primary particle diameter of less than 1 μm have come to be used. Such a fine particulate positive active material is suited to high-rate charge and discharge because it has a relatively large specific surface area. For example, Patent Document 1 below describes a positive active material for a lithium secondary battery, which is a particulate positive active material consisting of a composite metal oxide containing lithium and manganese, wherein the percentage of particles that remain in a state of primary particles without forming secondary particles is more than half of the total of all the composite metal oxide particles.

The second requirement of a lithium secondary battery used as a motor drive power source is high durability. That is, vehicular batteries are used over a long period of time while being charged and discharged at a high rate (with high output) under severe environmental conditions, which may include extreme temperature changes (such as low temperatures below −20° C. and high temperatures above 60° C.). Thus, they must be durable enough that the increase in internal resistance of the battery is controlled under such conditions of use. One way of satisfying this second requirement is to support the positive active material particles at high densities at a specific location (that is, in the positive active material layer) on the positive collector. An effective way of doing this is to raise the (percentage) content of binder in the positive active material layer.

However, when the (percentage) content of binder is increased, the (percentage) content of the positive active material is decreased proportionally, reducing the capacity of the battery. For example, in the technology described in Patent Document 1 above, it is expected that a large quantity of binder will be required so that the particulate positive active material, more than half of which consists of primary particles, does not peel (separate) from the positive electrode collector.

Patent Document 2 below discloses a secondary battery positive electrode, wherein the primary particles constituting the positive active material are bound with a water-soluble polymer binder to thereby form aggregates (secondary particles) of linked primary particles, and these secondary particles are then bound with each other and to the positive electrode collector with a fluororesin binder or rubber-based binder. The binding force of the positive active material layer is described as being improved with this configuration, but relatively large quantities of at least two different binders are required. Another document of prior art of this type is Patent Document 3 below for example. This document describes obtaining improved electron conductivity of the positive active material particles by mixing carbon fiber with the particulate lithium phosphoric acid transition metal compound constituting the positive active material.

Patent Document 1: Japanese Patent Application Laid-open No. 2003-203632
Patent Document 2: Japanese Patent Application Laid-open No. 2007-234277
Patent Document 3: Japanese Patent Application Laid-open No. 2008-117749

DISCLOSURE OF THE INVENTION

It is an object of the present invention, which was created in order to resolve the problems of prior art described above with respect to lithium secondary batteries and particularly lithium secondary batteries for automotive use, to provide a positive electrode for a lithium secondary battery whereby the adhesion strength of the positive active material in the positive active material layer can be improved without raising the (percentage) content of binder, thereby improving the battery capacity. It is another object of the present invention to provide a positive active material and other materials for constituting such a positive electrode. It is another object to provide a method for manufacturing a positive electrode.

The present invention also provides a lithium secondary battery equipped with the positive electrode disclosed here, and a manufacturing method therefor. The present invention also provides a vehicle (typically an automobile) having, as a motor drive power source, a lithium secondary battery equipped with the positive electrode disclosed here.

A positive electrode for a lithium secondary battery with the following composition is provided by the present invention. That is, one positive electrode disclosed here is a positive electrode for a lithium secondary battery, provided with a positive electrode collector and a positive active material layer formed on this collector. In one positive electrode disclosed here, the positive active material layer is composed of a matrix phase containing at least one particulate positive active material and at least one binder, and an aggregate phase dispersed in the matrix phase, constituted by aggregation of at least one particulate positive active material and containing substantially no binder.

Thus, in the lithium secondary battery positive electrode disclosed here the positive active material layer has a so-called sea-island structure comprising a matrix phase (sea) which is a continuous phase containing a binder and an aggregate phase of aggregates (islands) dispersed independently from one another in the matrix. The aggregate phase is the part containing substantially no binder, but because the aggregates are enveloped by a matrix phase containing a binder, they can be stably maintained in the positive active material layer without peeling (separating) from the positive active material layer.

In a positive electrode provided with a positive active material layer having a sea-island structure consisting of such a matrix phase and aggregate phase, the structural stability (i.e., high adhesion strength) of the positive active material layer itself can be ensured while reducing the (percentage) content of the binder according to the extent of the aggregate phase. In addition, use of the binder can be limited to the matrix phase. Moreover, the (percentage) content of the positive active material per unit volume of the positive active material layer can be increased according to the extent of the aggregate phase.

Thus, with a lithium secondary battery positive electrode of this configuration the adhesion strength of the positive active material in the positive active material layer can be increased without raising the (percentage) content of the binder, thereby providing a lithium secondary battery (typically a lithium-ion battery) with improved durability. Because of the presence of the aggregate phase, moreover, the capacity of the battery can be improved by increasing the (percentage) content of the active material per unit volume of the positive active material layer (or per unit area of the positive electrode collector).

Preferably, the matrix phase and aggregate phase both contain at least one positive active material of the same composition. With this configuration, it is possible to provide a lithium secondary battery provided with a positive active material layer having excellent structural stability.

Preferably, a conductive coat of a conductive material is formed on the surface of the positive active material. In this embodiment, it is especially desirable that the conductive material be a carbonaceous material, and that a conductive carbonaceous coat be formed on the surface of the positive active material.

With such a configuration, conductivity between positive active material particles is improved in the matrix phase and/or aggregate phase, thereby providing a lithium secondary battery with improved performance (for example, excellent high-rate characteristics).

More preferably, the at least one binder contained in the matrix phase is a polymer compound having at least one functional group, and the binder composed of the polymer compound binds molecularly to carbon atoms constituting the carbonaceous coat on the positive active material contained in the matrix phase, thereby forming, in the matrix phase, a complex compound composed of the binder that binds molecularly to these carbon atoms and a carbon network constituting the carbonaceous coat including these carbon atoms.

"Binds molecularly" in the present invention means that the polymer compound constituting the binder binds (links) to carbon atoms in the carbonaceous coat, so that a single molecular chain (that is, a complex compound consisting of a carbon network component and a binder component) is formed from this bound (linked) polymer compound part and the carbon network constituting the carbonaceous coat including the bound carbon atoms. Consequently, "binds molecularly" here does not include cases in which two molecules (compounds) exist independently of one another, as in physical adsorption (van der Waals adsorption for example).

In a lithium secondary battery positive electrode of this configuration, a conductive carbonaceous coat is formed on the surface of the positive active material contained in the matrix phase, while a binder is molecularly bound (by a condensation reaction via the aforementioned functional group for example) to this carbonaceous coat on at least some of the positive active material. The positive active material particles in the matrix phase can thus be maintained with strong adhesion strength even using a relatively small amount (percentage content) of binder. It is thus possible to provide a lithium secondary battery in which high durability is achieved without excessively raising the (percentage) content of the binder in the matrix phase, and in which the increase in internal resistance is controlled. The aggregate phase can also be retained more stably by means of a matrix phase with these properties.

The matrix phase preferably contains, as the aforementioned binder, at least one polymer compound having hydroxyl groups and/or carboxyl groups. If a polymer compound having such functional groups is used as a binder, the polymer compound constituting the binder can be linked favorably to the carbonaceous coat on the surface of the positive active material particles by chemical binding via these functional groups (that is, can bind molecularly as discussed above). Desirable examples of this polymer compound include vinylidene fluoride polymers having introduced therein hydroxyl groups and/or carboxyl groups and having vinylidene fluoride as a principal monomer component. Thus, the positive electrode of a preferred embodiment comprises this vinylidene fluoride polymer as a binder.

In another preferred embodiment of the lithium secondary battery positive electrode disclosed here, a network of the binder is formed by crosslinking of the polymer compound with itself in the matrix phase. Forming a network of the binder crosslinked with itself in the matrix phase of the positive active material layer (that is, a network in which the molecules of the binder are crosslinked with one another) in this way serves to improve the adhesion strength of the positive active material particles in the matrix phase while also improving the ability to retain the aggregate phase.

In another preferred embodiment of the lithium secondary battery positive electrode disclosed here, the positive active material constituting the aggregate phase is composed of a particulate composite oxide in which the average particle diameter of the primary particles based on measurement with an electron microscope (that is, a transmission electron microscope (TEM) or scanning electron microscope (SEM)) is 1 μm or less. Using such a fine particulate positive active material serves to increase the specific surface area of the positive active material. Thus, a lithium secondary battery with excellent conductivity suited to high-rate charge and discharge is provided by using the positive electrode of this embodiment.

In another preferred embodiment of the lithium secondary battery positive electrode disclosed here, at least one kind of the positive active material is the compound represented by the following formula:

$$\text{LiMAO}_4 \tag{1}$$

In this formula, M is one or two or more elements (typically one or two or more metal elements) including at least one metal element selected from the group consisting of Fe, Co, Ni and Mn. That is, it includes at least one metal element selected from the group consisting of Fe, Co, Ni and Mn, but a small quantity of a minor additional element may also be present (or may also be absent). A in this formula is one or two or more elements selected from the group consisting of P, Si, S and V.

A lithium secondary battery with still better high-rate charge and discharge performance can be provided by adopting this polyanionic particulate compound as the positive active material.

It is especially desirable that A be P and/or Si in Formula (1).

To achieve the aforementioned objects, the present invention also provides a method for manufacturing a lithium secondary battery positive electrode provided with a positive electrode collector and a positive active material layer formed on this collector.

That is, the positive electrode manufacturing method disclosed here encompasses:

preparing a positive active material layer-forming material that contains aggregates constituted by aggregation of at least one particulate positive active material and containing substantially no binder, the aggregates being dispersed in a composition containing at least one particulate positive active material, at least one binder and a solvent capable of dispersing or dissolving the binder; and coating the positive active material layer-forming material on the surface of the positive electrode collector to thereby form, on the positive electrode collector, a positive active material layer composed of a matrix phase containing at least one particulate positive active material and at least one binder, and an aggregate phase composed of the aggregates dispersed in the matrix phase.

The aforementioned lithium secondary battery positive electrode of the present invention can be manufactured by the manufacturing method of this embodiment.

Preferably, the positive active material layer-forming material is prepared so that at least one positive active material of the same composition is contained in both the matrix phase and the aggregate phase. A lithium secondary battery provided with a positive active material layer with excellent structural stability can be manufactured by using a positive active material layer-forming material of this composition.

Preferably, a conductive coat composed of a conductive material is formed in advance on the surface of the particles of the positive active material used in preparing the positive active material layer-forming material. In this embodiment, it is particularly desirable to use, as the conductive material, a carbonaceous material composed of a compound containing carbon element, and to coat this carbonaceous material on the surface of the particles of the positive active material and then heat the positive active material in a non-oxidizing atmosphere to thermally decompose the carbonaceous material to thereby form a conductive carbonaceous coat on the surface of the particles of the positive active material. By forming a conductive coat in this way, it is possible to improve conductivity between positive active material particles in the matrix phase and/or aggregate phase, and to produce a lithium secondary battery with improved performance (for example, excellent high-rate characteristics).

Aggregates containing substantially no binder and constituted by aggregation of positive active material particles with the carbonaceous coat formed thereon are preferably formed at the same time that the carbonaceous coat is formed by the aforementioned thermal decomposition treatment. A positive electrode with the desired properties can be manufactured efficiently by such an embodiment.

The positive active material layer-forming material is preferably prepared by adding the aforementioned aggregates to the aforementioned composition followed by mixing with agitation. A positive active material layer-forming material can be easily prepared in this way.

Preferably, a positive active material layer-forming material is prepared using a polymer compound having at least one functional group as the binder, and this positive active material layer-forming material is coated on the surface of the aforementioned positive collector, after which a condensation reaction is performed between the carbonaceous coat on the positive active material and the binder contained in the matrix phase of the positive active material layer, thereby molecularly binding the polymer compound constituting the binder to at least some of the carbon atoms constituting the carbonaceous coat on the positive active material.

In this embodiment, the positive active material particles in the matrix phase can be maintained with high adhesion strength even using a relatively small amount (percentage content) of the binder. It is thus possible to produce a lithium secondary battery in which high durability is achieved without excessively raising the (percentage) content of the binder in the matrix phase, and in which the increase in internal resistance is controlled.

Preferably, a polymer compound having hydroxyl groups and/or carboxyl groups is used as the binder. It is especially desirable that at least one kind of the polymer compound to be used be a vinylidene fluoride polymer having introduced therein hydroxyl groups and/or carboxyl groups and having vinylidene fluoride as a principal monomer component.

In a preferred embodiment of the positive electrode manufacturing method disclosed here, a polymer compound constituting the binder contained in the positive active material layer is crosslinked with itself. A network of the binder can be formed in the matrix phase by thus crosslinking a polymer compound of the binder with itself.

It is desirable to use, as the positive active material, a positive active material consisting of the aforementioned composite oxide in which the average particle diameter of primary particles based on measurement with an electron microscope (TEM or SEM) is 1 μm or less.

For example, a preferred example of the composite oxide constituting the positive active material is the compound represented by the following formula:

$$LiMAO_4 \qquad (1).$$

In this formula, M is one or two or more elements (typically one or two or more metal elements) including at least one metal element selected from the group consisting of Fe, Co, Ni and Mn. That is, it includes at least one metal element selected from the group consisting of Fe, Co, Ni and Mn, but a small quantity of a minor additional element may also be present (or may also be absent). A in this formula is one or two or more elements selected from the group consisting of P, Si, S and V. It is particularly desirable for A in Formula (I) above to be P and/or Si.

The present invention also provides a lithium secondary battery (typically a lithium-ion battery) provided with any of the positive electrodes disclosed here.

Any of the lithium secondary batteries disclosed here has properties that are particularly suitable for a battery to be mounted in a vehicle requiring high-right charge and discharge in particular. Thus, a vehicle equipped with any of the lithium secondary batteries disclosed here is provided by the present invention. In particular, a vehicle (such as an automobile) having this lithium secondary battery as a power source (typically, the power source of a hybrid vehicle or electrical vehicle) is provided.

DESCRIPTION OF EMBODIMENTS

Preferred embodiments of the present invention are explained below. Matters not specifically mentioned in this description which are necessary for implementing the present invention can be understood as design matters by a person skilled in the art based on prior art in the field. The present invention can be implemented based on the content described in this Description and on technical common knowledge in the field.

A collector corresponding to the substrate of a positive electrode is explained first. A metal collector of a material similar to that of a collector used in the positive electrode of a conventional lithium secondary battery (typically a lithium-ion battery) can be used. For example, an aluminum material or alloy material consisting primarily of aluminum is preferred as a constituent material of the positive electrode collector of this kind of battery. For example, an aluminum foil about 5 μm to 100 μm thick can be used favorably for the collector of the positive electrode of a lithium secondary battery used as an automotive motor drive power source. Of course, a collector of a metal other than aluminum can be used as long as it is one that is applicable to the positive electrode collector of a lithium secondary battery.

The positive electrode disclosed here is a lithium secondary battery positive electrode comprising a positive electrode collector and a positive active material layer formed on this collector, wherein the positive active material layer has a sea-island structure comprising a matrix phase and an aggregate phase.

Like the positive active material layer of a conventional lithium secondary battery (typically a lithium-ion battery), the matrix phase is composed of at least one particulate positive active material and at least one binder. The aggregate phase on the other hand is composed of particles of at least one kind of positive active material, which are aggregated and dispersed in the matrix phase. The aggregate phase also contains substantially no binder. "Contains substantially no" here means that binder cannot be intentionally added to the aggregate phase during the positive electrode manufacturing process, but unintentional intrusion of some (trace) binder from the matrix phase into some part of the aggregate phase (typically the boundary with the matrix phase) is allowable.

The particulate positive active materials used to constitute the matrix and aggregate phases are not particularly limited as to composition or particle form as long the objects of the present invention can be achieved thereby. Examples of typical positive active materials include complex oxides comprising lithium and at least one transition metal element. Examples include cobalt-lithium complex oxide ($LiCoO_2$), nickel-lithium complex oxide ($LiNiO_2$) and manganese-lithium complex oxide ($LiMn_2O_4$), as well as binary lithium-containing complex oxides containing two transition metal elements, such as nickel-cobalt $LiNi_xCo_{1-x}O_2$ (0<x<1), cobalt-manganese $LiCo_xMn_{1-x}O_2$ (0<x<1) and nickel-manganese $LiNi_xMn_{1-x}O_2$ (0<x<1) or $LiNi_xMn_{2-x}O_4$ (0<x<2) oxides, and ternary lithium-containing complex oxides such as nickel-cobalt-manganese oxides containing three transition metal elements.

The compound represented by the following formula:

$$LiMAO_4 \qquad (1)$$

is an example of a positive active material of an especially preferred embodiment. In this formula, M is one or two or more elements (typically one or two or more metal elements) including at least one metal element selected from the group consisting of Fe, Co, Ni and Mn. That is, it includes at least one metal element selected from the group consisting of Fe, Co, Ni and Mn, but a small quantity of a minor additional element may also be present (or may also be absent). A in this formula is one or two or more elements selected from the group consisting of P, Si, S and V.

This kind of polyanionic compound (typically, a compound having an olivine structure) is desirable because it has a high theoretical energy density, and allows the use of expensive metal elements to be avoided or reduced. Especially desirable polyanionic compounds include those in which A is P and/or Si in Formula (1) above (such as $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$ and $LiNiSiO_4$). In these compounds, oxygen release at high temperatures can be controlled because oxygen is fixed by covalent binding with P or Si which is an element other than a transition metal.

Like similar conventional complex oxides, the various complex oxides described above that constitute the positive active material can be obtained by mixing the constituent elements of the complex oxides and various sources (compounds) selected appropriately according to the atomic composition in specific molar amounts, and baking the mixture by appropriate means at a specific temperature.

For example, a suitable lithium source compound and one or more transition metal source compounds can be mixed with phosphoric acid or silicic acid (or a suitable phosphoric acid salt or silicic acid salt) and baked at a suitable temperature, and the baked product can then be pulverized and granulated to obtain a polyanionic compound in which A is P or Si in Formula (1) above.

For example a lithium compound such as lithium carbonate or lithium hydroxide can be used as a lithium source compound. For the source compounds of nickel, cobalt and other transition metals, hydroxides, oxides, various salts (such as carbonates), halides (such as fluorides) and the like of these constituent metals can be selected.

After baking, the resulting complex oxide (positive active material) can be pulverized by appropriate means, and then granulated as necessary to manufacture a particulate positive active material with the desired average particle diameter.

It is desirable to use a particulate positive active material in which the average particle diameter of the primary particles (for example, the 50% median diameter (d50) based on SEM, TEM or other electron microscopy) is 1 μm or less, such as one in which the average particle diameter of the primary particles based on electron microscopy is at least 0.1 μm but no more than 1 μm (or preferably at least 0.1 μm but no more than 0.8 μm). The average particle diameter of the secondary particles of the particulate positive active material can be easily measured using an electron microscope or laser diffraction (light scattering) particle size distribution meter.

Because of its large surface area, a positive active material with such a small average particle diameter improves the electrical conductivity of the positive active material layer. It is desirable to use a fine particulate positive active material (such as the aforementioned polyanionic compound or another complex oxide) with a specific surface area ($m^2/g$) based on the BET method of at least 5 $m^2/g$, or more preferably at least 10 $m^2/g$ (for example, a specific surface area of 5 $m^2/g$ to 20 $m^2/g$ or preferably 10 $m^2/g$ to 20 $m^2/g$ based on the BET method). In particular, such a fine particulate positive active material can be used favorably as the positive active material constituting the aggregate phase. This fine particulate positive active material can be used by preference as the positive active material having the same composition in both the aggregate phase and the matrix phase.

In general, such a positive active material (for example, a polyanionic compound such as lithium iron phosphate ($LiFePO_4$) that assumes an olivine structure, or another complex oxide) with a small average particle diameter (primary particle diameter) can be easily prepared by an ordinary hydrothermal synthesis method. However, a step of preparing the positive active material by hydrothermal synthesis or the like is not required when implementing the present invention as long as such a fine particulate positive active material is obtained from suitable sources.

Using such a particulate positive active material with a small particle diameter, the positive active material can be retained with high adhesion strength in the positive active material layer (matrix phase and aggregate phase). In other words, with the present invention a positive electrode can be provided in which a particulate positive active material with a small particle diameter is retained with high adhesion strength in a positive active material layer. By using a particulate positive active material with a small particle diameter, it is possible to improve the conductivity of the positive active material layer and provide a lithium secondary battery positive electrode suited to high-rate charge and discharge.

A conductive coat consisting of a conductive material is preferably formed on the surface of the particulate positive active material that is used. Various conductive inorganic oxide materials (chromium oxide, indium-tin metal oxide and the like), conductive polymer materials (polypyrroles and the like) and carbonaceous materials can be used favorably as the conductive material constituting this conductive coat. Carbonaceous materials are particularly desirable conductive materials, and positive active material particles having a conductive carbonaceous coat (typically a carbon film) formed on the surface thereof are particularly desirable for implementing the present invention. By using a positive active material coated on at least part of the surface with these conductive materials, it is possible to improve the conductivity of the positive active material constituting the positive active material layer. This carbonaceous coat or a conductive coat of another material can be formed on the surface of the positive active material particles by methods similar to those used in the past.

A carbonaceous coat or a conductive coat of an inorganic oxide can be formed by first applying the raw materials of the coat to the surface of the positive active material particles, and then baking the positive active material particles in a suitable gas atmosphere (for example, an oxidizing gas atmosphere suited to the precursor materials used, or a reducing gas atmosphere or other non-oxidizing atmosphere). A conductive coat of a conductive polymer material can be formed by adding the polymer material preferably together with a suitable binder to a suitable solvent and mixing to prepare a slurry composition that is then applied to the surface of the positive active material particles and dried (or preferably heat treated at a temperature range at which the conductive polymer is not thermally decomposed) to thereby easily form a conductive coat.

For example, a carbonaceous material can be coated on the surface of the particulate compound constituting the positive active material, and this coated material can then be thermally decomposed to thereby form the desired carbonaceous coat (typically a carbon film composed of a network consisting solely of carbon particles) on the surface of the positive active material. Examples of desirable carbonaceous materials for this purpose include various polymer materials containing carbon. Examples of organic compounds include various polymers such as (1) polyolefin resin, polyvinyl acetate, polybutadiene, polyvinyl alcohol and other synthetic resins, and (2) styrene, acetylene and other hydrocarbons. Of these, a hydrophilic material is desirable because it does not require an organic solvent to disperse the material, and a hydrophilic resin such as polyvinyl alcohol can be used by preference.

Carbonaceous material/positive active material aggregates can be formed by mixing the particulate positive active material and carbonaceous material at a specified mass ratio, for example by mixing 0.5 to 10 (or typically 1 to 5) parts by mass carbonaceous material per 100 parts by mass positive active material in a suitable solvent to prepare a slurry, and then using a suitable dryer or oven (for example, a device that dries or bakes using a turning fluid system) to remove the solvent from the slurry. Next, the carbonaceous material/positive active material aggregates are heated in vacuum (ultra-low-pressure gas) or in a non-oxidizing (or reducing) atmosphere at a temperature range that allows thermal decomposition of the carbonaceous material. This serves to thermally decompose the carbonaceous material coating the surface of the positive active material, thereby coating the surface of the positive active material with the residual carbon component (thermal decomposition product). The mass proportion of the carbonaceous coat as a percentage of the total mass of the positive active material particles including the carbonaceous coat is not particularly limited, but is preferably about 1 to 5 mass %.

Aggregates constituted by aggregation of the positive active material particles with carbonaceous coat obtained by this process can be used favorably as a material of the aggregate phase of the positive active material layer disclosed here.

The thickness and coating area (that is, the coating rate relative to the total area of the positive active material particles) of the formed carbonaceous coat can be adjusted by varying the mass proportions of the mixed positive active material and carbonaceous material. The average thickness of the carbonaceous coat based on SEM or other observation is preferably 1 μm or less (typically 50 nm to 1000 nm, especially 100 nm to 500 nm), although this is not intended as a limitation. With this degree of thickness, it is possible not only to improve electrical conductivity but also to bind (link) the binder favorably to the coat surface (carbon atoms).

The binder used together with the aforementioned positive active material in the matrix phase of the positive active material layer can be any conventionally used in positive active material layers, but a binder composed of a polymer compound having at least one functional group is preferred. This allows the binder to be molecularly bound to the surface of the positive active material particles.

This kind of functional group is not particularly limited as long as it is a functional group with reactivity that enables molecular binding with the surface of the positive active material. When using a positive active material having a carbonaceous coat formed on the surface thereof as discussed above, it is preferably one capable of reacting (by condensation for example) with this surface (typically either with the carbon atoms constituting the carbonaceous coat, or with hydroxyl (—OH) or other functional groups introduced on this coat) to thereby constitute a single chain by linkage of the two (that is, a complex compound composed of the binder component and the network part of the carbonaceous coat). Examples of suitable functional groups of this kind include hydroxyl and carboxyl groups. For example, a polymer compound having carboxyl (—COOH) and/or hydroxyl (—OH) groups is preferred.

For example, chemical bonds in the form of —C—O—C— (or —C—O—O—C) can be produced by a dehydration condensation reaction between a polymer compound having these functional groups and the carbon network constituting the carbonaceous coat, thereby suitably binding the polymer compound (binder) to any of the carbon atoms of the carbonaceous coat on the surface of the positive active material.

For example, desirable examples include vinylidene fluoride polymers having introduced therein functional groups, in which the principal monomer component is vinylidene fluoride, a monomer component of polyvinylidene fluoride (PVdF), which is a polymer compound commonly included as a binder in positive active material layers. A vinylidene fluoride polymer having hydroxyl groups and/or carboxyl groups introduced as functional groups is especially desirable.

A polymer containing such functional groups can be obtained by co-polymerization with a dibasic acid ester (such as a monoester) that is co-polymerizable with vinylidene fluoride. A co-polymerizable dibasic acid or ester thereof (such as a maleic acid, fumaric acid, succinic acid, itaconic acid or other dibasic acid ester) can be used favorably, although this is not intended as a limitation. For example, 100 parts by mass of vinylidene fluoride (monomer) and about 0.1 to 10 parts by mass of an unsaturated dibasic acid ester such as maleic acid monomethyl ester (or maleic acid monoethyl ester) can be added to ion-exchange water, and suspension polymerized for about 12 hours to 72 hours (0.5 days to 3 days), typically at room temperature range (such as 20 to 35° C.). After completion of polymerization this can be dehydrated, water washed as necessary, and dried to obtain a vinylidene fluoride polymer having functional groups (such as carboxyl groups) derived from the dibasic acid ester. The actual methods for manufacturing a polymer having such functional groups are well-known techniques of prior art, and will not be described in further detail.

An alternative to manufacturing the target polymer (high-molecular-weight compound) with various introduced functional groups by the copolymerization process described above is to subject an existing polymer (high-molecular-weight compound) to suitable modification treatment to thereby introduce functional groups into the polymer chain.

It is especially desirable to form the positive active material layer (also called the positive electrode mix layer) on the positive electrode collector using a functional group-containing binder as discussed above and a positive active material having a carbonaceous coat as discussed above.

As discussed above, the positive active material layer disclosed here is a positive active material layer with a sea-island structure comprising the aforementioned matrix phase and aggregate phase. Suitable methods for manufacturing a positive active material layer with this structure are explained below.

In the method for manufacturing a positive electrode for a lithium secondary battery disclosed here, a material (positive electrode material) is prepared for forming a positive active material layer having a sea-island structure comprising a matrix phase and an aggregate phase.

The material (positive electrode material) for forming a positive active material layer with this sea-island structure comprises aggregates containing substantially no binder constituted by aggregation of at least one particulate positive active material as the material for forming the aggregate phase, dispersed in a matrix phase-forming composition containing at least one particulate positive active material, at least one binder and a suitable solvent capable of dispersing or dissolving the binder.

The matrix phase-forming composition in this positive active material layer-forming material is typically prepared in a paste form (here and below, includes both slurry and ink forms) by adding and kneading a particulate positive active material and at least one binder in a suitable solvent. This matrix phase-forming composition in paste form is hereunder called the "matrix phase-forming paste".

As in conventional lithium secondary batteries, compounds (oxides) of various compositions can be used for the particulate positive active material used in preparing the matrix phase-forming paste. A fine particulate positive active material with a conductive coat (especially a carbonaceous coat) formed thereon as discussed above is used by preference.

For the binder, it is desirable to use a polymer compound having functional groups as discussed above. For example, by preparing a matrix phase-forming composition having a positive active material with a carbonaceous coat and a polymer compound with functional groups as components, it is possible to form a single molecular chain (that is, a complex compound composed of a binder component and a carbon network part of the carbonaceous coat) by molecular linkage with the carbon atoms constituting the carbonaceous coat on the positive active material in a positive active material layer (matrix phase) formed from this composition, while also forming a network by intermolecular crosslinking of the polymer compound (such as the aforementioned vinylidene fluoride polymer) constituting the binder contained in the matrix phase. As a result, a positive active material layer (matrix phase) with high adhesion strength and excellent structural stability can be formed using a smaller amount of binder than in the past. The amount of binder as a percentage of the total solids (typically, the total of the positive active material and binder) in the matrix phase-forming paste is not particularly limited, but is preferably set at 15 mass % or less (such as 5 to 15 mass %, or preferably 10 to 15 mass %) by adjusting the added amount of the binder. By using a paste containing such a proportion of binder, it is possible to keep the mass proportion of the binder as a percentage of the total mass (100 mass %) of the matrix phase in the positive active material layer to 15 mass % or less (such as 5 to 15 mass %, or preferably 10 to 15 mass %). As discussed above, the binder content in the positive active material layer as a whole can be further reduced by adding an aggregate phase-forming material.

The solvent used in preparing this matrix phase-forming paste can be any capable of dispersing or dissolving the binder used, and various organic solvents (a good example being N-methyl-2-pyrrolidone (NMP)) or aqueous solvents (typically water, but also those that are aqueous overall, such as aqueous solutions containing methanol, ethanol and other lower alcohols) can be used.

A suitable amount of a powdered carbon material (conductive material) such as acetylene black, ketjen black or another carbon black or the like (graphite or the like) can also be added as necessary when preparing the matrix phase-forming paste. If the aforementioned carbonaceous coat or another conductive coat is formed on the surface of the positive active material, however, it may be possible to add less of such conductive material, or omit it altogether.

Typically, the matrix phase-forming paste can be prepared as a dispersion of positive active material particles by adding the various solid components to a solvent, and then pulverizing and agitating them by suitable means (such as a bead mill or other mill).

In the positive electrode manufacturing method disclosed here, the positive active material layer-forming material can be prepared by adding and dispersing aggregates for the aforementioned aggregate phase in a matrix phase-forming paste prepared as described above.

These aggregates can typically be formed by heat-treating specific positive active material particles (by baking at a temperature range of 700° C. to 1300° C. for example) to thereby aggregate the particles with one another. For example, a powder material consisting of a fine particulate positive active material with an average particle diameter of 1 μm or less of the primary particles based on electron microscopy can be baked in a suitable gas atmosphere at a temperature range of about 700° C. to 1300° C. (preferably 800° C. to 1200° C.) to obtain aggregates of the positive active material having an average particle diameter of 5 μm to 50 μm based on electron (SEM) microscopy, and containing no binder. A suitable amount of a powdered carbon material (conductive material) such as acetylene black, ketjen black or another carbon black or the like (graphite or the like) can also be added when preparing the aggregates. If the aggregates are formed using a positive active material having a carbonaceous coat or other conductive coat formed on the surface, however, it may be possible to add less of such conductive material, or omit it altogether.

In a preferred aggregate manufacturing method, carbonaceous material/positive active material aggregates can be formed by adding and mixing a carbonaceous material at a specific ratio with a powered material consisting of the positive active material (ideally a fine particulate positive active material having the average particle diameter described above). Next, the carbonaceous material/positive active material aggregates can be heated in vacuum (ultra-low-pressure gas) or a non-oxidizing (or reducing) atmosphere at a temperature range that allows thermal decomposition of the carbonaceous material, to thereby obtain aggregates consisting of positive active material particles with a carbonaceous coat formed by thermal decomposition of the carbonaceous material adhering thereto. In this embodiment, formation of the carbonaceous coat and preparation of the aggregates can be performed simultaneously.

A positive active material layer-forming material prepared in the desired paste form (hereunder called a "positive active material layer-forming paste") can be obtained by adding the aggregates prepared above (preferably aggregates consisting of a particulate positive active material with a carbonaceous coat formed thereon) to a matrix phase-forming composition (paste), and mixing the two with agitation. Preferably, the amount of aggregates added to the matrix phase-forming paste is adjusted so that the proportion of binder as a percentage of the total solids in the paste (typically, the total of the positive active material and binder) is 1 to 10 mass % (preferably 2 to 7 mass %). For example, preferably the aggregates are added to a matrix phase-forming paste in which the proportion of binder as a percentage of the total solids (total of positive active material and binder) has been adjusted to 10 to 15 mass %, to prepare a positive active material layer-forming paste in which the proportion of binder as a percentage of the total solids (total of positive active material and binder) is 2 to 7 mass %.

With the present invention, a positive active material layer with a sea-island structure and high adhesion strength attributable to the binder in the matrix phase can be formed even if the (percentage) content of the binder is low in this way as a percentage of the positive active material layer as a whole.

Figure 4:
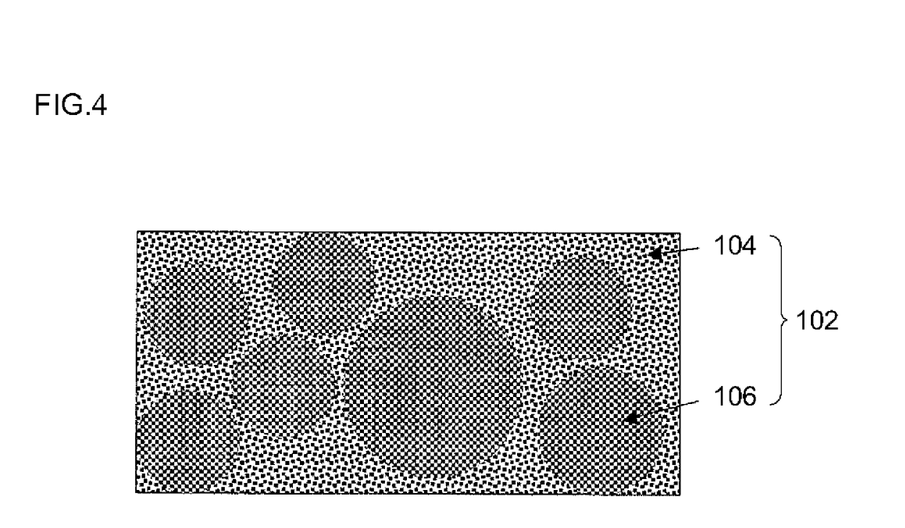
FIG. 4 is an explanatory drawing illustrating the sea-island structure of a positive active material layer manufactured by the present invention.

A suitable amount of the prepared positive active material layer-forming paste is coated on a positive electrode collector composed preferably of aluminum or an alloy consisting primarily of aluminum, and then dried and pressed to prepare a lithium secondary battery positive electrode provided with a positive electrode collector and a positive active material layer formed on this collector. In this way, positive active material layer 102 consisting of matrix phase 104 and aggregate phase 106 dispersed in this matrix phase 104 can be formed on a positive electrode collector, as illustrated in FIG. 4 and as shown in an electron microscopic image (FIG. 5) showing the cross-section of a lithium secondary battery positive electrode formed in an example discussed below.

In a preferred embodiment, if an active material with a carbonaceous coat formed on the surface thereof (that is, with a network of carbon atoms formed on the surface of the active material particles) is used at least for the particulate active material contained in the matrix phase, and a polymer compound (for example, a vinylidene fluoride polymer having vinylidene fluoride as a principal monomer component and having introduced therein hydroxyl groups and/or carboxyl groups) having functional groups (such as hydroxyl groups and/or carboxyl groups) as discussed above is used as the binder contained in the matrix phase, coating of the positive active material layer-forming paste on the positive electrode collector is followed by treatment to chemically bond the functional group-containing polymer compound and the particulate positive active material with carbonaceous coat contained in the matrix phase of the positive active material layer.

This treatment may differ depending on the type of functional groups, but when the functional groups are carboxyl groups or hydroxyl groups, the functional group-containing polymer compound (i.e. binder) is preferably molecularly bonded to the particulate positive active material via the functional groups by means of a condensation reaction (especially a dehydration condensation reaction).

For example, the positive active material layer formed by coating the positive active material layer-forming paste can be depressurized to a suitable level (near vacuum) and heated (at 100° C. to 250° C. for example, or preferably 150° C. to 200° C.). Molecular bonding (linkage) between the carbonaceous coat and the binder by a dehydration condensation reaction can preferably be accomplished by performing such depressurization and heating treatment.

To increase the frequency of chemical bonding between the carbonaceous coat and the binder, it is desirable for example to subject the surface of the carbonaceous coat on the positive active material to some kind of modification treatment to thereby introduce functional groups into the carbon network. For example, hydroxyl groups can be introduced at a relatively high rate onto the carbon atoms constituting the carbonaceous coat of the positive active material by performing surface plasma treatment in the presence of steam (water molecules).

Typically, however, hydroxyl groups or other organic functional groups may already be present on the surface of carbonaceous coat formed by a process such as that described above. For example, hydroxyl groups are introduced into the carbonaceous coat (carbon network) by reaction with steam in the air. Thus, a functional group-containing polymer compound can be molecularly bound (linked) to the carbonaceous coat of the positive active material by causing a dehydration condensation reaction or the like, without any such additional surface plasma treatment or other surface modification treatment.

As can be seen from the explanation above, the dehydration condensation reaction may occur not only between the functional group-containing polymer compound (binder) and the carbonaceous coat of the positive active material, but also within the binder depending on the molecules constituting the binder. That is, binding of the binder with itself (intermolecular crosslinking in other words) or intramolecular crosslinking within the molecular chains of the polymer compound constituting the binder may occur. Thus, the polymer compound constituting the binder contained in the matrix phase of the positive active material layer can be crosslinked with itself by causing such a condensation reaction. Alternatively, when double bonds and other multiple bonds are present in the molecular chains of the binder, intermolecular crosslinking of the binder with itself may occur as a result of cleavage and addition reactions in this part. These crosslinking reactions serve to form networks by binding the binder contained in the matrix phase with itself.

Because a network is formed by such crosslinked binding of the polymer compound constituting the binder, the structural stability of the matrix phase can be improved even with a relatively small amount of binder (such as 10 mass % or less binder as a percentage of the positive active material layer as a whole (solids), or typically 1 to 10 mass %, or preferably about 2 to 7 mass %, or more preferably 5 mass % or less, such as 2 to 5 mass %). Moreover, the aggregates (aggregate phase) are retained by means of this matrix phase. It is thus possible to construct a high-capacity lithium secondary battery with an increased (percentage) content of positive active material due to a reduction in the (percentage) content of binder, while suppressing a rise in the internal resistance of the battery, which has excellent durability and is suited to high-rate charge and discharge.

Next, one mode for constructing a lithium secondary battery (lithium-ion battery in this case) using the lithium secondary battery positive electrode of the present invention is explained.

A lithium secondary battery negative electrode can be constructed by conventional methods as the counter-electrode of the positive electrode disclosed here. The negative electrode active material used in the negative electrode of the lithium secondary battery can be any material capable of storing and releasing lithium ions, and examples include graphite and other carbon materials, lithium-titanium oxide ($Li_4Ti_5O_{12}$) and other oxide materials, and alloy materials consisting of alloys of tin (Sn), aluminum (Al), zinc (Zn), silicon (Si) and the like. A typical example is a powdered carbon material consisting of graphite or the like. Graphite particles in particular can be a negative active material suited to high-rate charge and discharge (such as high-output discharge) because they have a small particle diameter and a large surface area per unit volume.

As with the positive electrode, a negative active material layer-forming composition (negative active material layer-forming paste) can be prepared by dispersing this powdered material in a solvent together with a suitable binder, and kneading the mixture. A suitable amount of this paste is coated on a negative electrode collector composed preferably of copper, nickel or an alloy of these, and dried and pressed to prepare a lithium secondary battery negative electrode.

A separator used together with the positive and negative electrodes may be similar to a conventional separator. For example, a porous sheet (porous film) of polyolefin resin or the like can be used. Alternatively, a solid polymer electrolyte can be used as the separator.

An electrolyte (typically an electrolyte solution) similar to the nonaqueous electrolytes used in conventional lithium secondary batteries can be used as the electrolyte, without any particular limitations. It is composed of the aforementioned solid polymer electrolyte, or typically of a supporting salt contained in a suitable non-aqueous solvent. For example, one or two or more selected from the group consisting of propylene carbonate (PC), ethylene carbonate (EC), diethyl carbonate (DEC), dimethyl carbonate (DMC), ethylmethyl carbonate (EMC) and the like can be used as the non-aqueous solvent. One or two or more lithium compounds (lithium salts) selected from the group consisting of $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$ and the like can be used as the supporting salt for example.

The lithium secondary battery to be constructed is not particularly limited as to shape (outer shape and size) as long as it uses the lithium secondary battery positive electrode disclosed. It may be a thin sheet-type battery with a case composed of a laminate film or the like, or a battery with a cylindrical or oblong battery case, or a small button type battery.

The mode of use of the lithium secondary battery positive electrode disclosed here is explained below using the examples of a lithium secondary battery (here, a lithium-ion battery using a non-aqueous electrolyte solution) provided with a coiled electrode body, and an assembled battery (battery pack) for automotive use constructed using this battery as a component part (single battery), but the intent is not to limit the present invention to this embodiment.

In the drawings below, parts and sites providing the same function are labeled with the same symbols, and redundant explanations may be omitted or abbreviated. The dimensional relationships (length, width, thickness, etc.) in the drawings do not reflect actual dimensional relationships.

Figure 1:
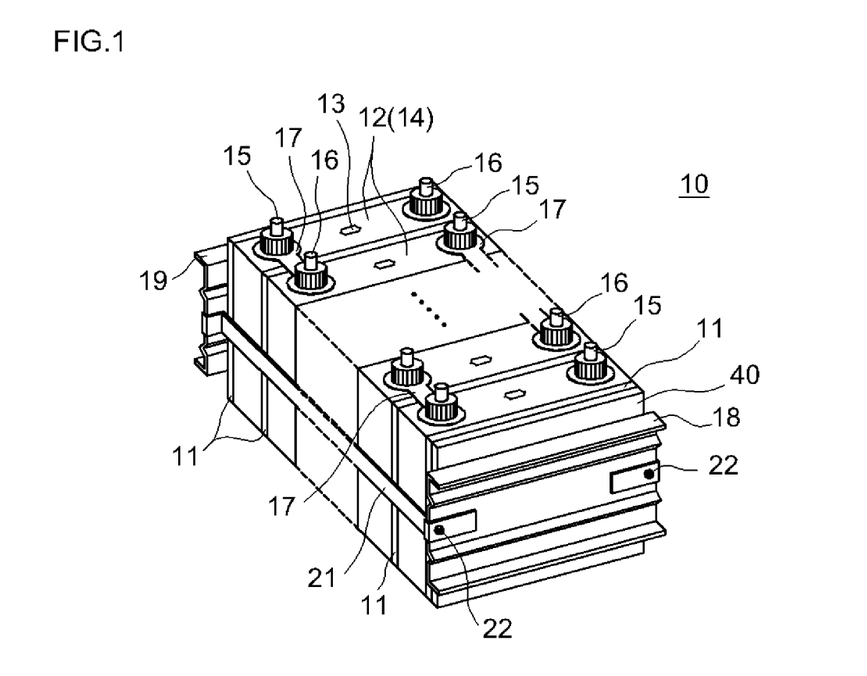
FIG. 1 is an oblique view illustrating a battery pack of one embodiment of the present invention.

Like a single battery in a conventional battery pack, single battery 12 used as a component of battery pack 10 of this embodiment is typically provided with an electrode body having specific battery component materials (the respective active materials of the positive and negative electrodes, the collectors of the positive and negative electrodes, the separator, etc.), together with a container for containing the electrode body and a suitable electrolyte as shown in FIG. 1.

The battery pack 10 disclosed here is provided with a specific number (typically at least 10, or preferably about 10 to 30, such as 20) single batteries 12 of the same shape. Single batteries 12 are each provided with container 14 having a shape (a flat box in this embodiment) capable of containing the flat, coiled electrode body described below. The size of each part of single battery 12 (for example, the thickness in the direction of lamination and other outer dimensions) may vary depending on dimensional errors and the like during manufacture of containers 14.

Container 14 is provided with positive terminal 15 connected electrically to the positive electrode of a coiled electrode body, and negative terminal 16 connected electrically to the negative electrode of this electrode body. Between single batteries 12, as shown in the drawing, a positive terminal 15 on one side is connected electrically by connector 17 to a negative terminal 16 on the other side. Battery pack 10 with a specific voltage is constructed by connecting single batteries 12 in this way in a series.

Like a conventional single battery container, container 14 may be provided with safety valve 13 and the like for releasing gas generated in the container. The configuration of this container 14 is not a feature of the present invention, and detailed explanations are omitted.

The material of container 14 is not particularly limited as long as it is one used in conventional single batteries. For example, a container made of metal (aluminum, steel or the like) or synthetic resin (polypropylene or other polyolefin resin, or polyethylene terephthalate, polytetrafluoroethylene, polyamide resin or another high melting point resin for example) or the like can be used by preference. The container 14 of this embodiment is made of aluminum for example.

Figure 2:
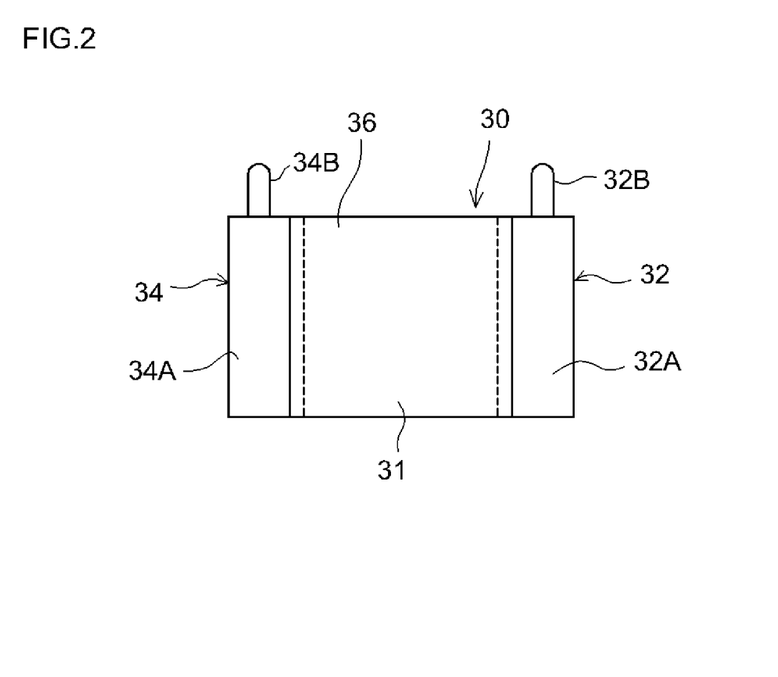
FIG. 2 is a front view illustrating one example of a coiled electrode body.
Figure 3:
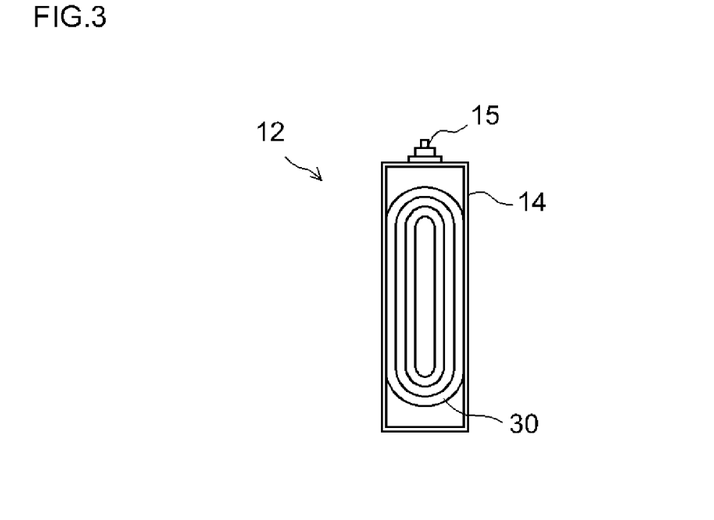
FIG. 3 is a cross-section illustrating the configuration of a single battery to be used in a battery pack.

As shown in FIGS. 2 and 3, single battery 12 has flat, coiled electrode body 30, which is prepared like the coiled electrode body of a conventional lithium-ion battery by laminating positive sheet electrode 32 (hereunder sometimes called "positive electrode sheet 32") and negative sheet electrode 34 (hereunder sometimes called "negative electrode sheet 34") with two sheet-shaped separators 36 (hereunder sometimes called "separator sheets 36"), coiling these with positive electrode sheet 32 and negative electrode 34 slightly offset, and then compressing the coiled electrode body from the side.

As shown in FIGS. 2 and 3, because the electrodes are slightly offset laterally as described above relative to the coiling direction of coiled electrode body 30, part of the edges of positive electrode sheet 32 and negative electrode sheet 34 protrude outside coiled core area 31 (that is, the area in which a part of positive electrode sheet 32 with a formed positive active material layer and a part of negative electrode sheet 34 with a formed negative active material layer are tightly coiled together with separator sheets 36). Positive lead terminal 32B and negative lead terminal 34B are attached to this positive electrode protruding part (part without formed positive active material layer) 32A and negative electrode protruding part (part without formed negative active material layer) 34A, respectively, and these lead terminals 32B and 34B are then connected electrically to positive electrode terminal 15 and negative electrode terminal 16, respectively.

The actual materials and parts constituting a coiled electrode body 30 of this configuration may be the same as in the electrode body of a conventional lithium-ion battery, without any particular limitations, as long as the electrode disclosed here having a positive active material layer with a sea-island structure formed on a collector (positive electrode sheet 32 here) is used as the positive electrode.

Positive electrode sheet 32 is formed by applying a lithium-ion battery positive active material layer to a strip-shaped positive electrode collector (such as a strip of aluminum foil). The form of the positive electrode collector is not particularly limited and may differ depending on the form of the lithium secondary battery and the like, but may be a bar, plate, sheet, foil, mesh or the like for example.

In this embodiment, a positive electrode collector sheet is used as a form suited to use in a lithium secondary battery (single battery) 12 provided with coiled electrode body 30. For example a strip of aluminum foil about 2 m to 4 m (for example, 2.7 m) long, 8 cm to 12 cm (for example, 10 cm) wide and 5 μm to 30 μm (for example, 10 μm to 20 μm) thick can be used for the collector. A positive active material layer can be formed by coating the collector surface with a positive active material layer-forming paste prepared as described above. This paste can be favorably applied to the surface of the positive electrode collector using a suitable coating device such as a gravure coater, slit cutter, die coater, comma coater or the like.

After coating of the paste, the solvent contained in the paste (typically water) is dried off, and the paste is pressed to form the positive active material layer. A conventional known pressing method such as roll pressing, plate pressing or the like can be used as the pressing method. When adjusting the thickness of the positive active material layer, the thickness can be measured with a film thickness meter, and pressing can be performed multiple times with the pressure adjusted until the desired thickness is attained.

In a preferred embodiment, when an active material having a carbonaceous coat formed on the surface thereof is used for at least the particulate positive active material contained in the matrix phase and a polymer compound (such as a vinylidene fluoride polymer having introduced therein hydroxyl groups and/or carboxyl groups, and having vinylidene fluoride as a principal monomer component) having functional groups as discussed above (such as hydroxyl groups and/or carboxyl groups) is used as the binder, the positive electrode collector with the positive active material layer formed on the surface thereof is enclosed in a pressure chamber (vacuum chamber), and a condensation reaction (typically a dehydration condensation reaction) is performed under vacuum conditions (such as 0.01 MPa or less (roughly 1/10 of atmospheric pressure or less), or preferably 0.001 MPa or less (roughly 1/100 of atmospheric pressure or less)). The reaction may occur at room temperature range (typically 20 to 35° C.), but preferably the dehydration condensation reaction is performed under high-temperature conditions (such as 100 to 200° C.).

This condensation reaction serves to molecularly bind the binder to the surface of the carbonaceous coat on the positive active material particles contained in the matrix phase, thereby forming a complex compound composed of a binder constituent part and a carbon network part of the carbonaceous coat, while crosslinking the molecules of the binder with one another. More preferably, the binder can be molecularly bound to the surface of the carbonaceous coat not only on the positive active material particles in the matrix phase, but also on the positive active material particles on the surface of the aggregate phase, thereby forming a complex compound composed of a binder constituent part and the carbon network part of the carbonaceous coat.

Positive electrode sheet 32 having a positive active material layer with good adhesion strength using a relatively small quantity of binder (that is, a positive active material layer composed of a matrix phase and an aggregate phase) is obtained by forming such crosslinked structures.

Meanwhile, negative electrode sheet 34 can be formed by applying a negative active material layer for a lithium-ion battery to a negative electrode collector strip. A conductive member made of a metal with good conductivity can be used as the negative electrode collector. Copper can be used for example. The form of the negative electrode collector is not particularly limited and may differ depending on the shape and the like of the lithium secondary battery, but various forms such as bar, plate, sheet, foil and mesh forms and the like are possible. In the present embodiment, a sheet-shaped negative electrode collector is used because this form is suited to use in a lithium secondary battery (single battery) 12 provided with coiled electrode body 30. The sheet can preferably be prepared for example using a copper foil about 2 m to 4 m (such as 2.9 m) long, 8 cm to 12 cm (such as 10 cm) wide and 5 μm to 30 μm (such as 10 μm to 20 μm) thick as the negative electrode collector, by coating the surface of this collector with a negative active material layer-forming paste (containing 94 to 98 mass % graphite, 1 to 3 mass % SBR and 1 to 3 mass % CMC for example) prepared by adding and dispersing or dissolving a suitable negative active material (typically graphite or another carbon material) and a binder and the like in a suitable solvent (water, an organic solvent or a mixed solvent of these), drying off the solvent, and then pressing the electrode.

An example of a desirable separator 36 for use between positive and negative electrode sheets 32 and 34 is one composed of a porous polyolefin resin. For example, a porous separator sheet of synthetic resin (for example, polyethylene or other polyolefin resin) about 2 m to 4 m (such as 3.1 m) long, 8 cm to 12 cm (such as 11 cm) wide and 5 μm to 30 μm (such as 25 μm) thick can be used.

In the case of a lithium secondary battery using a solid electrolyte or gel electrolyte as the electrolyte (a so-called lithium-ion polymer battery), a separator may be unnecessary (because the electrolyte itself can function as a separator).

Single battery 12 is constructed by enclosing flat, coiled electrode body 30 in container 14 with the coiling axis arranged sideways as shown in FIG. 3, injecting a non-aqueous electrolyte (electrolyte solution) such as a mixed solvent of diethyl carbonate and ethylene carbonate (mass ratio 1:1 for example) containing a suitable amount (for example, 1M concentration) of a supporting salt (such as $LiPF_6$ or another lithium salt), and sealing the container.

As shown in FIG. 1, multiple single batteries 12 of the same shape constructed as described above are inverted one by one so that positive terminals 15 alternate with negative terminals 16, and arrayed with the wide surfaces of containers 14 (that is, the surfaces corresponding to the flat sides of coiled electrode bodies 30 contained in containers 14 as discussed below) facing each other. Cooling plates 11 of a specific shape are disposed between the arrayed single batteries 12 in close contact with the wide surfaces of containers 14, and on the two ends of the series of single batteries (in the direction of lamination). These cooling plates 11 function as exothermic members to efficiently dissipate heat generated inside each single battery during use, and preferably have a frame shape that allows the introduction of cooling fluid (typically air) between single batteries 12. Alternatively, cooling plates 11 made of a thermally conductive metal or a light, hard polypropylene or other synthetic resin are also desirable.

A pair of end plates 18 and 19 are disposed on the outside of the cooling plates 11 disposed at the two ends of the arrayed single batteries 12 and cooling plates 11 (together sometimes called the "single battery group"). One or multiple spacer sheets 40 can also be inserted as a length adjustment means between the cooling plate 11 and end plate 18 disposed at one end (right in FIG. 2) of the single battery group. The material of spacer sheet 40 is not particularly limited, and various materials (metal materials, resin materials, ceramic materials and the like) capable of providing a thickness adjustment function as discussed below can be used. A metal material or resin material is desirable from the standpoint of withstanding shock, and for example a light polyolefin resin spacer sheet 40 can be used by preference.

The single battery group of single batteries 12 arrayed in the direction of lamination is restrained as a whole together with spacers 40 and end plates 18 and 19 by specific restraining pressure P exerted in the direction of lamination by restraining bands 21s, which are attached so as to span both end plates 18 and 19. More specifically, as shown in FIG. 1, the ends of each restraining band 21 are secured and fixed to end plates 18 by screws 22, so that the single battery group is restrained by means of specific restraining pressure P (for example, surface pressure of about 0.1 MPa to 10 MPa on the side wall of container 14) exerted in the direction of array. In battery pack 10 restrained by this restraining pressure P, restraining pressure is also exerted on coiled electrode body 30 inside container 14 of each single battery 12, and the gas generated inside container 14 can thus be prevented from accumulating inside coiled electrode body 30 (such as between positive electrode sheet 32 and negative electrode sheet 34) and detracting from the battery performance.

Lithium secondary batteries (sample batteries) using positive electrodes provided with the positive active material layer disclosed here were constructed as specific examples, and their performance was evaluated.

Example 1

Preparation of Positive Electrode Sheet (1)

Lithium hydroxide ($LiOH.H_2O$) was used as a lithium source, iron sulfate ($FeSO_4.7H_2O$) as an iron source and inorganic phosphoric acid ($H_3PO_4$) as a phosphorus source. Specifically, these source compounds were added and mixed in deionized water to a molar ratio of Li:Fe:P=3:1:1.

This mixed solution was placed in an autoclave and subjected to hydrothermal synthesis for about 12 hours at a high-temperature range of 170 to 180° C. After completion of the reaction this was cooled to room temperature, and the reaction product or in other words lithium iron phosphate ($LiFePO_4$) was collected. Next, the resulting compound was crushed in a ball mill to obtain a fine particulate positive active material (lithium iron phosphate) with an average particle diameter of about 0.7 μm of the primary particles based on electron microscopy.

Using polyvinyl alcohol as a carbonaceous material, a carbonaceous coat was formed on the surface of the aforementioned fine particulate positive active material. Specifically, an amount of polyvinyl alcohol corresponding to 5 mass % of the positive active material was added to a specific amount of the positive active material ($LiFePO_4$), and a slurry of this mixture dispersed in deionized water was prepared.

The resulting slurry was placed in a commercial turning fluid-type dryer (incinerator), the solvent (water in this case) was removed, and thermal decomposition treatment was performed for about 1.5 hours at 1100° C. in a hydrogen gas atmosphere. Positive active material aggregates with an average particle diameter of about 20 µm to 25 µm were thus formed consisting of positive active material particles having a carbonaceous coat formed on the surface thereof as a thermal decomposition product of polyvinyl alcohol in the reducing atmosphere.

Next, part of the resulting aggregates was placed again in a ball mill and crushed, to prepare positive active material fine particles with a carbonaceous coat and an average particle diameter of the primarily particles of about 0.7 µm based on electron microscopy. The coated amount of the carbonaceous coat as calculated from the composition was 2 to 3 mass % of the total positive active material fine particles including the carbonaceous coat.

A vinylidene fluoride polymer containing functional groups was prepared by suspension polymerization. Specifically, about 400 g of vinylidene fluoride polymer and about 4 g of maleic acid monomethyl ester were added to about 1000 ml of ion-exchange water, about 4 g of diisopropyl peroxydicarbonate as a polymerization initiator, about 3 g of ethyl acetate as a chain transfer agent and about 1 g of methyl cellulose as a suspension agent were added, and suspension polymerization was performed for 48 hours at 28° C. After completion of polymerization, the resulting slurry was dehydrated, water washed, and dried for 20 hours at about 80° C.

The carboxyl group content of the resulting polymer (hereunder simply called "modified polyvinylidene fluoride") was about $1 \times 10^{-4}$ mole/g. This modified polyvinylidene fluoride was used as the binder in this embodiment. The weight-average molecular weight of the resulting modified polyvinylidene fluoride as measured by gel permeation chromatography (GPC) was about 1 million.

A lithium secondary battery positive electrode was prepared using the fine particulate positive active material with surface carbonaceous coat prepared above and a binder consisting of the aforementioned polyvinylidene fluoride.

Specifically, 90 parts by mass of the fine particulate positive active material with carbonaceous coat (of which the carbonaceous coat constituted 2 parts by mass) and 10 parts by mass of binder (the modified polyvinylidene fluoride) were added to the dispersion solvent NMP (N-methyl-2-pyrrolidone) to a solids content of 60 mass %, and crushed and mixed with a bead mill to prepare a matrix phase-forming paste in which the solids were uniformly dispersed.

A specific amount of the aforementioned aggregates (average particle diameter about 20 µm to 25 µm) was added to the resulting matrix phase-forming paste, and mixed with agitation to prepare a positive active material layer-forming paste.

In detail, a specific amount of the aggregates was added to the matrix phase-forming paste obtained above so that the fine particulate positive active material with carbonaceous coat (of which the carbonaceous coat constituted about 2 to 3 mass %) constituted 95 mass % of the solids and the binder (the aforementioned modified polyvinylidene fluoride) constituted 5 mass % of the solids, given 100 mass % as the total solids, and the mixture was agitated and mixed with a commercial propeller-type agitation mixer.

Next, this positive active material layer-forming paste was coated to a coated amount of 20 mg/cm² to 50 mg/cm² of the positive active material per unit area on both sides of an aluminum foil (thickness about 20 µm) as the positive electrode collector, and dried. After drying, this was stretched into a sheet with a roll press to a thickness of about 50 µm, and was slit to obtain a specific width of the positive active material layer and prepare a positive electrode sheet.

The resulting positive electrode sheet was enclosed in a vacuum furnace, the inside of the furnace was depressurized to vacuum conditions (that is, atmospheric pressure around 0.001 MPa or less) and heated to 180° C. to 200° C., and a condensation reaction was performed for about 12 hours. It was thus possible to molecularly bond the functional groups (carboxyl groups in this case) of the binder in the positive active material layer (specifically the matrix phase) to the carbonaceous coat of the positive active material (that is, the carbon atoms constituting the coat). At the same time, it was possible to bond the binder (modified polyvinylidene fluoride) in the positive active material layer by crosslinking with itself.

Figure 5:
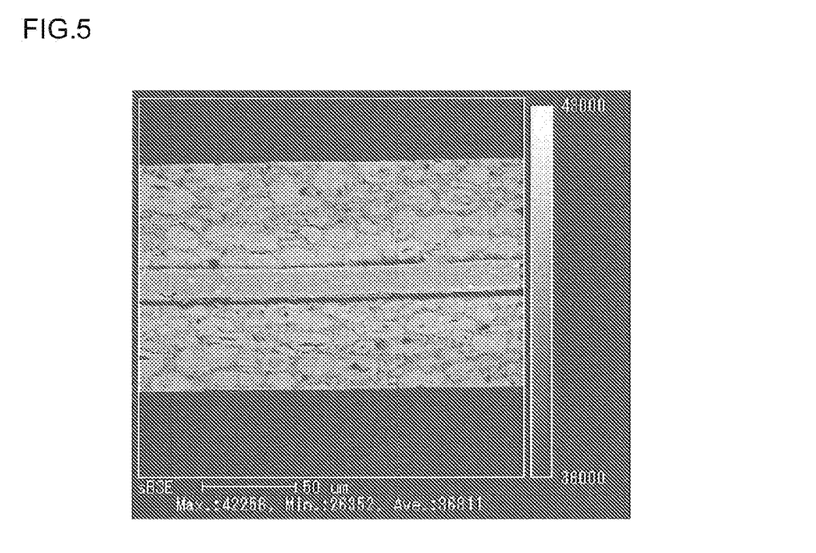
FIG. 5 is an electron microscope image showing the cross-sectional structure of a positive active material layer manufactured in one test example.

FIG. 5 shows an electron microscope image (SEM photograph) of the cross-sectional structure of a positive electrode sheet (Example 1) obtained in this way. As shown in this photograph, the resulting positive active material layer had a sea-island structure, with an aggregate phase (aggregates) corresponding to islands dispersed in the matrix phase. Based on SEM observation, the aggregate phase (aggregates) had a minimum particle size of about 1 µm and a maximum particle size of about 30 µm. The 50% median diameter (d50) based on SEM observation was about 5 µm. In the particle size distribution based on the same observation, the d10 was about 1 µm and the d90 was about 15 µm.

Example 2

Preparation of Positive Electrode Sheet (2)

A matrix phase-forming paste was prepared with the same materials and by the same processes as in Example 1 except that common polyvinylidene fluoride (PVdF) with a weight-average molecular weight of about 500,000 was used as the binder in place of the modified polyvinylidene fluoride binder used above. Specifically, 90 parts by mass of the aforementioned fine particulate positive active material with carbonaceous coat (of which the carbonaceous coat constituted about 2 parts by mass) and 10 parts by mass of binder (PVdF) were added to NMP to a solids content of 60 mass %, and crushed and mixed with a bead mill to prepare a matrix phase-forming paste in which the solids were uniformly dispersed.

Next, a specific amount of the same aggregates of positive active material with carbonaceous coat used in Example 1 above was added to the matrix phase-forming paste, and a positive active material layer-forming paste was prepared by the same processes as in Example 1 but with a higher active material content, with the fine particulate positive active material with carbonaceous coat (of which the carbonaceous coat constituted about 3 mass %) constituted 97 mass % of the solids and the binder (the aforementioned PVdF) constituted 3 mass % of the solids, given 100 mass % as the total solids.

Next, a positive electrode sheet (Example 2) was prepared by the same processes using the same collector as in Example 1 (but without a condensation reaction).

Comparative Example 1

Preparation of Positive Electrode Sheet (3)

A positive electrode sheet (Comparative Example 1) was prepared by the same processes and using the same collector as in Example 2, but using the matrix phase-forming paste prepared in Example 2 as the positive active material layer-forming paste. That is, this comparative example differed from the positive electrode sheets of Examples 1 and 2 above in that the positive active material layer formed on the collector did not have a sea-island structure. In other words, the positive active material layer of this comparative example consisted solely of a matrix phase.

Comparative Example 2

Preparation of Positive Electrode Sheet (4)

A paste was prepared having a higher active material content (or in other words a lower binder content) than the positive active material layer-forming paste used in Comparative Example 1.

Specifically, a positive electrode sheet (Comparative Example 2) was prepared by the same processes and using the same collector as in Comparative Example 1 except that 95 parts by mass of fine particulate positive active material with carbonaceous coat (of which the carbonaceous coat constituted about 3 parts by mass) and 5 parts by mass of binder (PVdF) were added to NMP to a solids content of 60 mass %, and crushed and mixed with a bead mill to prepare the paste of Comparative Example 2, in which the solids were uniformly dispersed. In this comparative example, as in Comparative Example 1, the positive active material layer formed on the collector lacked the sea-island structure of the positive electrode sheets of Examples 1 and 2 above, and consisted solely of a matrix phase.

Test Example 1

Preparation of Lithium Secondary Batteries

Next, lithium secondary batteries were prepared using the positive electrode sheets of each of the examples and comparative examples obtained above. The negative electrode sheets used as counter-electrodes were prepared as follows.

That is, a negative active material layer-forming paste was prepared by adding and mixing 95 parts by mass of graphite as the negative active material, 2.5 parts by mass of styrene-butadiene block copolymer (SBR) as a binder and 2.5 parts by mass of carboxymethyl cellulose (CMC) as a viscosity improver in ion-exchange water. Using a copper foil (thickness 10 μm) as the negative electrode collector, this negative active material layer-forming paste was then coated on both sides of the negative electrode collector to a coated amount of 10 mg/cm² to 25 mg/cm² of negative active material per unit area, and dried. After drying, this was stretched into a sheet by roll pressing to a thickness of about 60 μm, and was slit to obtain a specific width of the negative active material layer and prepare a negative electrode sheet. The coated amounts (volumes) of the positive and negative active material layers were set so as to obtain a theoretical capacity of 1 in the positive electrode and 1.5 in the negative electrode.

Lithium secondary batteries (lithium-ion batteries) were constructed as shown in FIGS. 2 and 3 using the positive and negative electrode sheets of either the examples or comparative examples prepared above. That is, a positive electrode sheet and negative electrode sheet were laminated with two separators, and this laminated sheet was coiled to prepare a coiled electrode body. This electrode body was then compressed into a flat shape and enclosed together with an electrolyte in an oblong container with a capacity of 100 mL, and the opening was sealed to construct a battery of this test example with a sealed structure. A porous film consisting of a polypropylene/polyethylene composite was used for the separators. A non-aqueous electrolyte composed of 1 mol/L of $LiPF_6$ dissolved in a mixed 1:1 (volume ratio) solution of propylene carbonate (PC) and diethyl carbonate (DEC) was used as the electrolyte.

Hereunder, a lithium secondary battery constructed using the positive electrode sheets of Example 1 or 2 is called the lithium secondary battery of Examples 1 or 2, respectively, while a lithium secondary battery constructed using the positive electrode sheet of Comparative Example 1 or 2 is called the lithium secondary battery of Comparative Example 1 or 2, respectively.

Test Example 2

Performance Evaluation Test of Lithium Secondary Batteries

The performance of the four (Examples 1 and 2 and Comparative Examples 1 and 2) lithium secondary batteries constructed in Test Example 1 above was evaluated.

First, using the constant-current, constant-voltage system for the amount of charge, the battery was charged up to the charge maximum voltage (4.2 V) at a current value (that is, 0.2 C) that was ⅕ of the battery capacity (Ah) anticipated from the theoretical positive electrode capacity at room temperature (about 25° C.), and then charged until the final current value during constant voltage charge was 1/10 the current value at the beginning of charging. This state is hereunder called full charge. A battery that had been thus fully charged was then discharged to 3 V at a current value (that is, 0.2 C) that was ⅕ of the battery capacity (Ah) anticipated from the theoretical positive electrode capacity. 0.2 C here means the current value at which the theoretical capacity can be released in 1/0.2 hours (i.e., 5 hours).

Based on this charge-discharge test, the discharge capacity (mAh/g) per unit volume of the positive active material was calculated. The results are shown in the corresponding part of Table 1.

The output (W) after 10 seconds of discharge from this fully charge state was also calculated, and the output density (W/L) per exterior volume of the container was calculated. The results are shown in the corresponding part of Table 1.

The cycle characteristics of the lithium secondary batteries of the examples and the lithium secondary batteries of the comparative examples were also determined as follows.

First, constant-current charge was performed to 4.2 V at 3 C (current value at which theoretical capacity can be released in ⅓ hour) under temperature conditions of 60° C., followed by constant-voltage charge for about 2 hours at 4.2 V, after which 3 C constant-current discharge was performed to a final voltage of 3 V. This charge and discharge cycle was repeated, and the capacity retention rate (%) was determined by comparing the discharge capacity of the $1^{st}$ cycle and the discharge capacity during the 1000 cycle. That is:

Capacity retention(%)=($1000^{th}$ cycle discharge capacity/$1^{st}$ cycle discharge capacity)×100.

The results are shown in Table 1.

TABLE 1

| Battery | Discharge capacity (mAh/g) | Output density (W/L) | Capacity retention (%) |
|---|---|---|---|
| Example 1 | 149 | 3700 | 89 |
| Example 2 | 152 | 3830 | 87 |

TABLE 1-continued

| Battery | Discharge capacity (mAh/g) | Output density (W/L) | Capacity retention (%) |
|---|---|---|---|
| Comparative Example 1 | 143 | 3100 | 74 |
| Comparative Example 2 | 149 | 3700 | 64 |

It is clear from the results of Table 1 that good results in terms of discharge capacity, output density and capacity retention were obtained with the lithium secondary batteries of Examples 1 and 2, which were provided with positive active material layers having sea-island structures.

By contrast, the lithium secondary battery of Comparative Example 1, in which the positive active material layer did not have a sea-island structure, was inferior to the lithium secondary batteries of the examples in terms of discharge capacity, output density and capacity retention. In the case of the lithium secondary battery of Comparative Example 2, in which the positive active material layer did not have a sea-island structure and the content of the binder was lower, the output density and discharge capacity were comparable to those of the examples, reflecting the high content of active material in the positive active material layer, but the capacity retention rate after 1000 cycles was extremely poor. This is an indication that in a conventional positive active material layer, high durability cannot be maintained if the binder constitutes 5 mass % or less of the total active material layer. Although detailed photographs and the like are not provided, in the lithium secondary battery of Comparative Example 2 disintegration of the positive active material layer was seen after the aforementioned cycle test to determined capacity retention.

The present invention was explained above by means of examples, but these matters do not limit the invention, and various modifications are of course possible.

Figure 6:
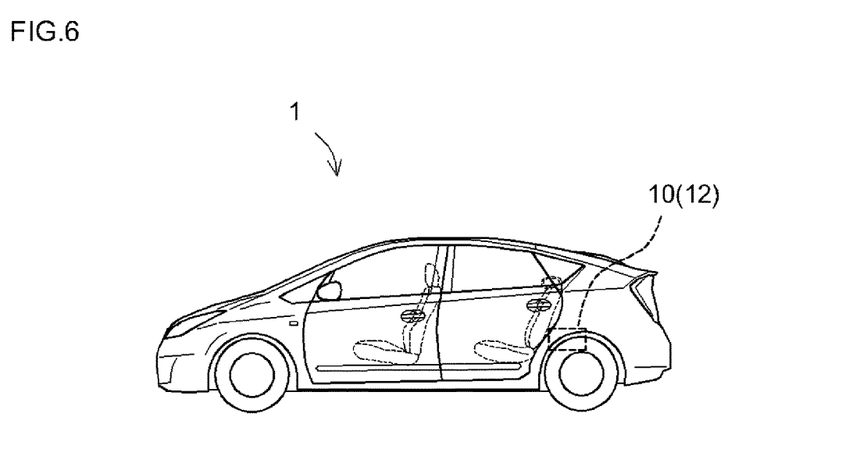
FIG. 6 is a side view illustrating a vehicle equipped with a lithium secondary battery.

Any of the lithium secondary batteries 12 and battery packs 10 disclosed here have properties suited to batteries for use in vehicles, including especially good high-rate charge-discharge characteristics and durability. Thus, as shown in FIG. 6, a vehicle 1 provided with any of the lithium secondary batteries 12 (battery packs 10) disclosed here is provided by the present invention. In particular, a vehicle (such as an automobile) is provided having this lithium secondary battery 12 as a power source (typically, the power source of a hybrid vehicle or electric vehicle).

INDUSTRIAL APPLICABILITY

The present invention provides a lithium secondary battery positive electrode provided with a positive active material layer having high adhesion strength of the positive active material. Consequently, a lithium secondary battery having excellent cycle characteristics and high durability can be provided using this positive electrode. In particular, a lithium secondary battery providing long-term high-rate charge-discharge performance (such as a vehicle-mounted lithium secondary battery for use as a drive power source in a vehicle) is provided.

The invention claimed is:

1. A positive electrode for a lithium secondary battery, comprising a positive electrode collector and a positive active material layer formed on this collector, wherein the positive active material layer is composed of:

a matrix phase comprising positive active material fine particles having an average particle diameter of 1 µm or less and at least one binder; and a plurality of aggregates being distinct from the matrix phase, and each of the plurality of aggregates being composed of positive active material particles having an average particle diameter of 5 µm to 50 µm and containing substantially no binder, wherein the plurality of aggregates are present in a state of being dispersed independently from one another in the positive active material layer, and wherein each of the plurality of aggregates is enveloped by the matrix phase.

2. The positive electrode according to claim 1, wherein the matrix phase and the aggregates both contain at least one positive active material of the same composition.

3. The positive electrode according to claim 1, wherein a conductive coat of a conductive material is formed on the surface of the positive active material fine particles of the matrix phase and the positive active material particles of the aggregates.

4. The positive electrode according to claim 3, wherein the conductive material is a carbonaceous material, and a conductive carbonaceous coat is formed on the surface of the positive active material fine particles of the matrix phase and the positive active material particles of the aggregates.

5. The positive electrode according to claim 4, wherein the at least one binder contained in the matrix phase is a polymer compound having at least one functional group, and the binder composed of the polymer compound binds molecularly to carbon atoms constituting the carbonaceous coat on the positive active material fine particles contained in the matrix phase, thereby forming, in the matrix phase, a complex compound composed of the binder that binds molecularly to these carbon atoms and a carbon network constituting the carbonaceous coat including these carbon atoms.

6. The positive electrode according to claim 5, wherein the matrix phase contains, as the binder, at least one polymer compound having hydroxyl groups and/or carboxyl groups.

7. The positive electrode according to claim 6, wherein a vinylidene fluoride polymer having introduced therein hydroxyl groups and/or carboxyl groups and having vinylidene fluoride as a principal monomer component is included as the polymer compound.

8. The positive electrode according to claim 5, wherein a network of the binder is formed by crosslinking of the polymer compound with itself in the matrix phase.

9. The positive electrode according to claim 1, wherein at least one kind of the positive active material is a compound represented by the general formula:

$$LiMAO_4 \qquad (1)$$

wherein M is one or two or more elements including at least one metal element selected from the group consisting of Fe, Co, Ni and Mn, and A is one or two or more elements selected from the group consisting of P, Si, S and V.

10. A lithium secondary battery comprising the positive electrode according to claim 1.

11. A vehicle comprising the lithium secondary battery according to claim 10.